(12) United States Patent
Izquieta Anaut

(10) Patent No.: US 8,894,909 B2
(45) Date of Patent: Nov. 25, 2014

(54) VALVE FOR MAKING HOLLOW FOOTWEAR SOLES AND METHOD FOR USING THE SAME

(75) Inventor: Jose Maria Izquieta Anaut, Navarra (ES)

(73) Assignee: Desarrollo Integral del Molde, S.L., Pamplona, Navarra (ES)

( * ) Notice: Subject to any disclaimer, the term of this patent is extended or adjusted under 35 U.S.C. 154(b) by 368 days.

(21) Appl. No.: 13/496,502

(22) PCT Filed: May 17, 2011

(86) PCT No.: PCT/ES2011/070354
§ 371 (c)(1), (2), (4) Date: Mar. 16, 2012

(87) PCT Pub. No.: WO2012/156544
PCT Pub. Date: Nov. 22, 2012

(65) Prior Publication Data
US 2012/0292829 A1 Nov. 22, 2012

(51) Int. Cl.
*B29D 35/12* (2010.01)
*B29C 49/60* (2006.01)
*A43B 13/04* (2006.01)
*B29D 35/00* (2010.01)
*F16K 15/06* (2006.01)
*F16K 15/20* (2006.01)
*F16K 27/02* (2006.01)

(52) U.S. Cl.
CPC ............ *A43B 13/04* (2013.01); *B29D 35/0045* (2013.01); *B29D 35/122* (2013.01); *F16K 15/063* (2013.01); *F16K 15/20* (2013.01); *F16K 27/0209* (2013.01)
USPC .......................................... 264/512; 251/366

(58) Field of Classification Search
None
See application file for complete search history.

(56) References Cited

U.S. PATENT DOCUMENTS

| | | | |
|---|---|---|---|
| 2,346,634 A | 4/1944 | Kempthorn |
| 3,978,881 A | 9/1976 | Mouranie |
| 4,148,338 A | 4/1979 | Skoli |
| 6,216,817 B1 | 4/2001 | Kannon et al. |
| 6,375,891 B1 | 4/2002 | Nishikawa et al. |

FOREIGN PATENT DOCUMENTS

| | | |
|---|---|---|
| EP | 2168753 A1 | 3/2010 |
| FR | 2389751 A1 | 12/1978 |
| JP | 60120031 A | 6/1985 |
| JP | 5069475 A | 3/1993 |
| JP | 2006192907 A1 | 7/2006 |

*Primary Examiner* — Monica Huson
(74) *Attorney, Agent, or Firm* — Albert Bordas, P.A.

(57) ABSTRACT

Valve and method for using it to insert a gas and punch orifices in plastic in molds used for making hollow footwear soles. The valve is linearly actuated, includes a helical spring and a stop such that the valve body head seals against a seat in the valve casing. Its configuration is thus simple, inexpensive and reliable, while the method is efficient as it is performed during the processing cycle of the plastic.

8 Claims, 3 Drawing Sheets

VALVE FOR MAKING HOLLOW FOOTWEAR SOLES AND METHOD FOR USING THE SAME

TECHNICAL FIELD OF THE INVENTION

The present invention lies in the field of valves for introducing a gas and piercing plastic.

The invention consists in a valve and the method for using it to introduce a gas and punching orifices in plastic in moulds used for making hollow footwear soles. The valve is linearly actuated, includes a helical spring and a stop such that the valve body head seals against a seat in the valve casing. Its configuration is thus simple, inexpensive and reliable, while the method is efficient as it is performed during the processing cycle of the plastic.

BACKGROUND OF THE INVENTION

Valves are known which introduce a gas inside a plastic body during its formation by pinching the plastic material to create an orifice through which to introduce the gas.

For example, U.S. Pat. No. 6,217,817 and Japanese Patent 2006-192907 describe a plastic body that is pierced by a needle through which the gas is introduced in the plastic body.

The needles are small diameter elements that are useful when the plastic is hard, such as in plastic bottles, but useless if the plastic is not set, as they are blunted.

U.S. Pat. No. 3,978,881 discloses a valve in which the gas is introduced perpendicular to the valve body, so that the device occupies a size too large to allow fitting it in a mould with the actuation area, for introducing gas and cutting the plastic, being within the part cavity.

To solve the aforementioned drawbacks of the state of the art, a description is provided of the following invention of a valve and the method for using it to introduce a gas and punch orifices in plastic in moulds used for making hollow footwear soles. The valve is linearly actuated and includes a helical spring and a stop, such that the valve body head seals against a seat in the valve casing. Its configuration is thus simple, inexpensive and reliable, while the method is efficient as it is performed during the processing cycle of the plastic.

DESCRIPTION OF THE INVENTION

The present invention is established and characterised in the independent claims, while the dependent claims describe additional characteristics thereof.

In view of the foregoing, the present invention relates to a valve for introducing a gas and punching plastic in moulds used for making hollow footwear soles.

This valve is linearly actuated, and comprises a casing attached to the mould inside which it houses the valve body, a helical spring, a stop and means for attaching the valve body to the stop.

The valve casing is cylindrical and has attachment means on its rear part and punching means on its front part; the valve body runs inside the casing and comprises a head and a stem, said valve body being attached to the stop by the means for attaching the valve body to the stop, such that the helical spring is crossed by the stem of the valve body and limited on its front part by the casing and on its rear part by the stop.

The gas runs between the valve body and the casing, the valve head provides a seal against a seat in the from part of the casing, the punching means surround the seat and are farther forward than the front end of the head of the valve stem, such that when the front part of the casing meets the plastic it does so in first place with the punching means, in order to pierce the plastic.

An advantage of the valve is that it occupies very little space, combining the two functions of cutting off and regulating the air that passes through it.

A further advantage of the valve is its simplicity, so that its construction is also simple and inexpensive, and it uses simple, inexpensive, reliable and lasting mechanical elements compared to complex valves in which the valve body is piloted by electrical, magnetic or pneumatic means.

In addition, the invention refers to a method for using a valve for introducing gas and punching plastic in moulds used to make hollow footwear soles, according to the characteristics of the valve, which comprises the following stages:

attaching the valve to the mould using the attachment means of the casing, closing the mould with the plastic in the mould cavity, such that the punching means rest against the opposite side of the mould to that on which they are attached, acting as a die for the punching, punching the plastic, introducing the gas through the valve to move forward the valve body against the resistance of the helical spring in order to separate the valve body head from its seat such that the gas will reach the mould cavity.

One advantage of this method is that it is completely efficient, as the punching and introduction of the gas is performed during the plastic processing time, so that the cycle time is not increased and therefore the cost of the part is not increased.

BRIEF DESCRIPTION OF THE DRAWINGS

This specification is supplemented with a set of drawings illustrating the preferred embodiment, which are never intended to limit the invention.

DETAILED DESCRIPTION OF THE PREFERRED EMBODIMENT OF THE INVENTION

Figure 1:
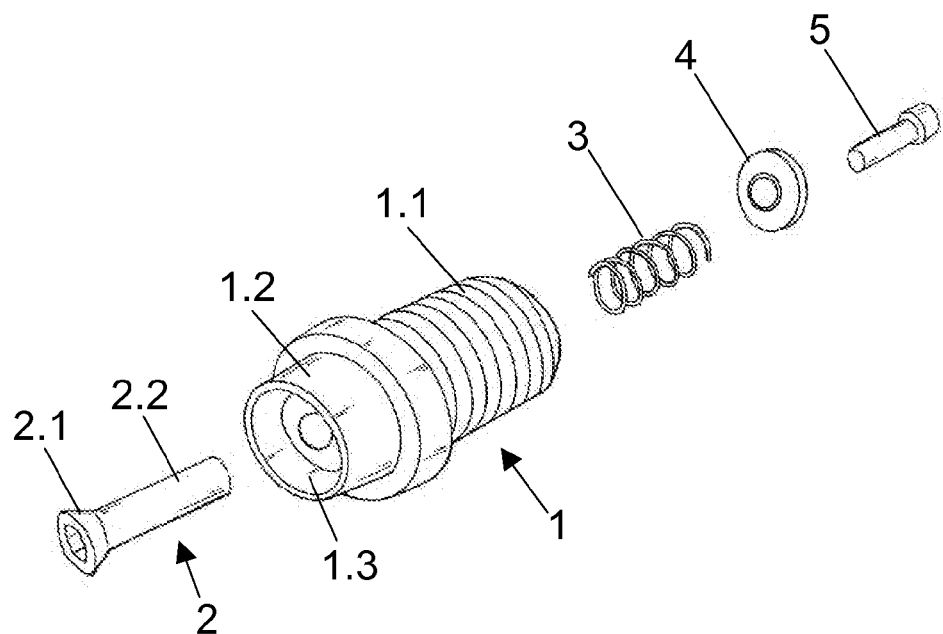
FIG. 1 represents an exploded perspective view of the valve.
Figure 2:
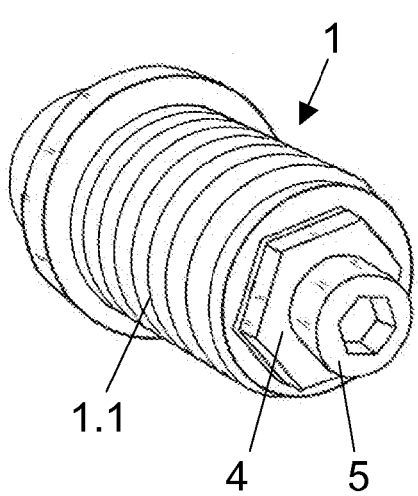
FIG. 2 represents a rear perspective view of the valve.
Figure 3:
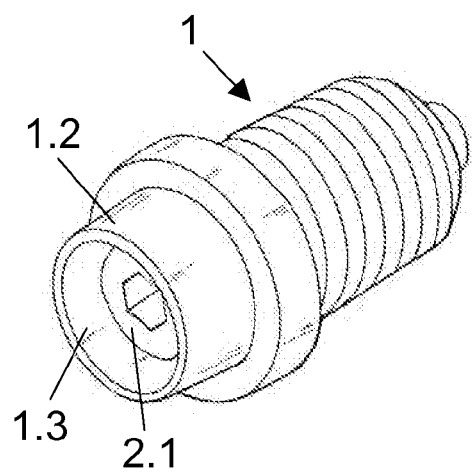
FIG. 3 represents a front perspective view of the valve.
Figure 4:
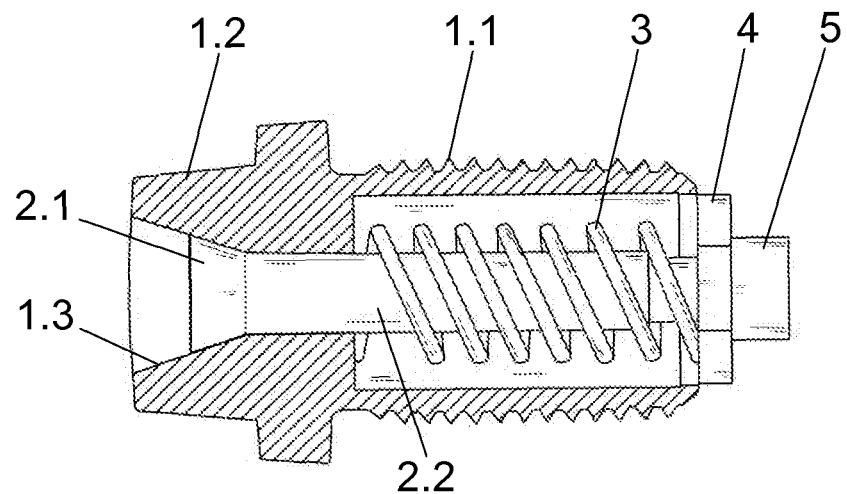
FIG. 4 represents a side cross-sectional view of the valve.
Figure 5:
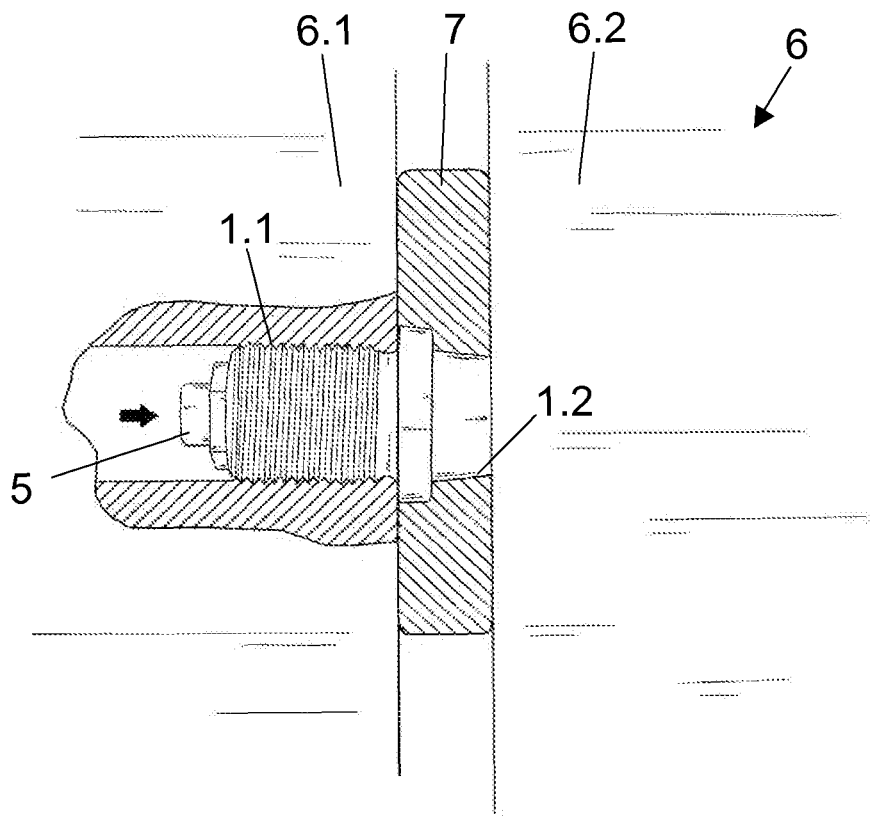
FIG. 5 represents a side cross-sectional view of the valve placed in a closed mould, with a first plastic in the cavity of said mould.
Figure 6:
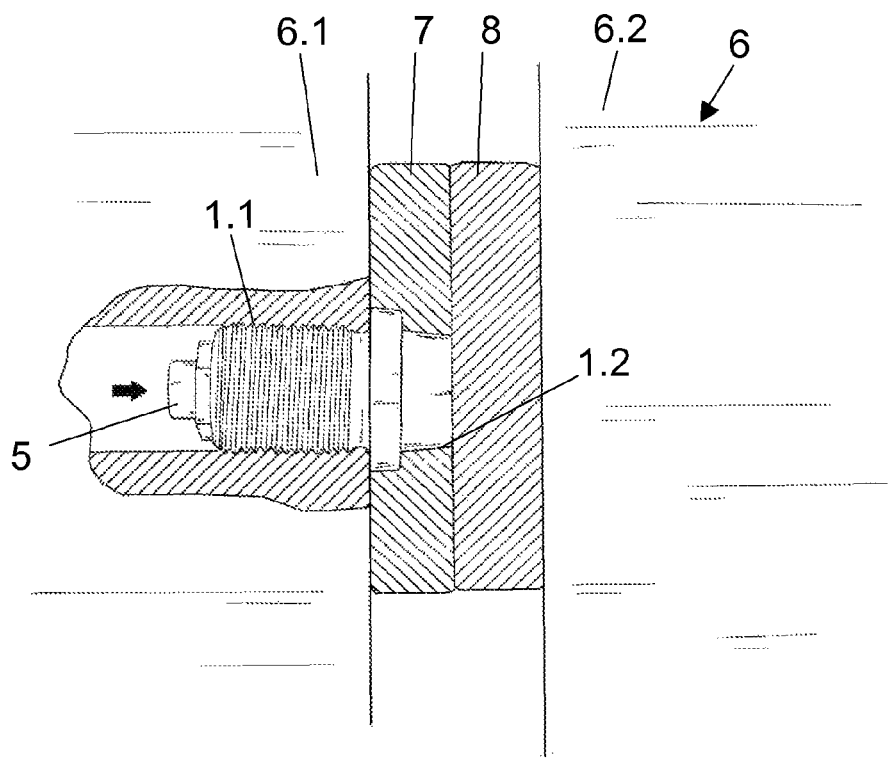
FIG. 6 represents a side cross-sectional view of the valve placed in a closed mould, with a first plastic and a second plastic in the cavity of said mould.
Figure 7:
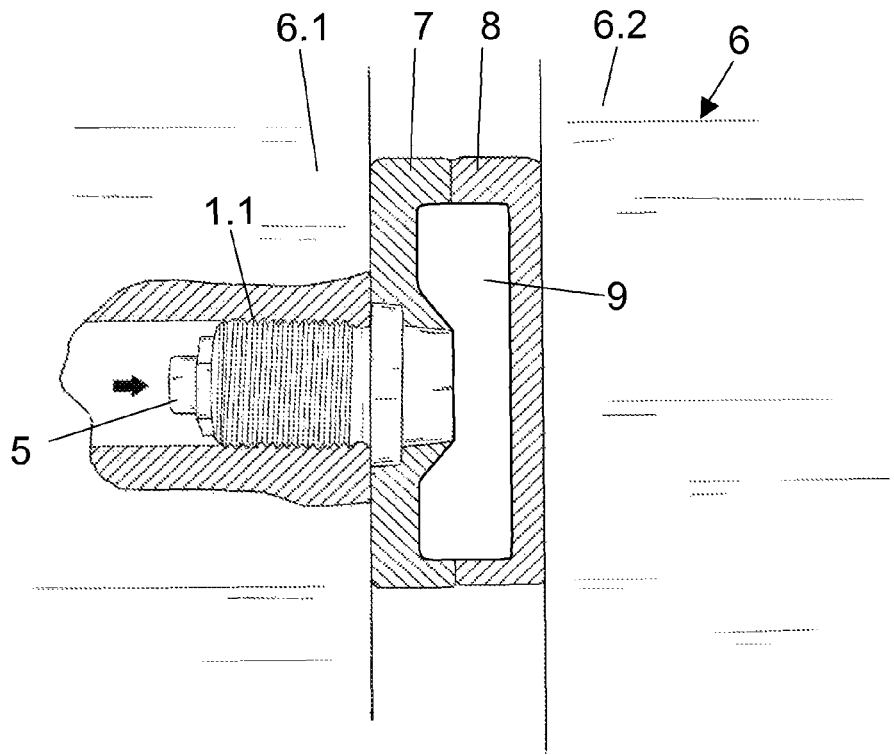
FIG. 7 represents the same side view as FIG. 6 showing the hollow cavity of the hollow footwear conformed.

The present invention relates to a valve for introducing a gas and punching plastic in moulds used to make hollow footwear soles.

By 'plastic material' is meant all materials of this type: both thermoplastic and thermosetting. The specific case of rubber is mentioned further below, considering it a type of thermosetting plastic.

The linear actuation of the valve means that the moving element of the valve moves linearly, in a straight line, in contraposition to the rotating movements of butterfly valves and the like.

This linear motion is what allows the gas to pass through the valve, that is, it is implicit in this type of valves that the gas runs parallel to the greater longitudinal axis of the moving element of the valve, which permits or obstructs the passage of this gas.

The valve comprises a casing (1), as its structural element, attached to the mould (6.1) in which it houses different components: a valve body (2), which is the moving element of the valve; a helical spring (3), which is the element that exerts a force on the valve body to allow or obstruct passage of the gas; a stop (4) as a limit of one face of the helical spring (3); and means (5) for attaching the valve body to the stop.

The casing (1) is cylindrical, generated as a body of revolution, with attachment means (1.1) on its rear part to attach it to the mould and punching means (1.2) on its front part to punch the plastic.

In this description 'front' refers to the direction towards the mould cavity and 'rear' refers to the opposite direction, towards the inside of the mould.

The punching means (1.2) do not punch or pierce a relatively small orifice as in other inventions of the state of the art; in the present invention, the plastic is punched with a diameter, for example, from 5 to 50 mm as a punching line that has been shown to be useful to the purpose of the invention described herein.

The valve body (2) runs inside the casing (1), that is, its linear motion is performed by sliding inside the casing.

The valve body (2) comprises a head (2.1) and a stem (2.2), and said valve body (2) is attached to the stop (4) by the means (5) for attaching the valve body to the stop, so that the helical spring (3) is crossed by the valve body stem (2.2) and is limited on its front part by the casing (1) and on its rear part by the stop (4).

In this way, from the front part of the valve the sequence of elements internal to the casing (1) is: valve body (2), stop (4), means (5) for attaching the valve body to the stop. The helical spring (3) is placed inserted in the valve body stem (2.2).

The gas runs through the space that exists between the valve body (2) and the casing (1); although this space may seem minimal it is sufficient, as even though it is only tenths of millimeter in some cases it must be considered that this is along a circumference, so that passage of the gas is guaranteed, as has been demonstrated in the tests conducted on prototypes of the invention.

The valve body head (2.1) seals against a seat (1.3) in the front part of the casing (1) to stop passage of the gas.

The punching means (1.2) surround the seat (1.3) and are farther forward that the front end of the valve body head (2.1), so that when the front part of the casing contacts the plastic (7) it does so first with the punching means (1.2) in order to punch the plastic (7).

This characteristic of the front part of the valve makes it especially different from what is known in the state of the art. On one hand, the valve body head (2.1) effects the seal there, in the head (2.1), and surrounding both the head (2.1) and the seal or seat (1.3) are the punching means (1.2), such that the latter always contact the mould (6.2) first; this is, the head (2.1) will never be in front of and contact it before the punching means (1.2).

The figures show the option of embodiment in which the valve body head (2.1) and the corresponding seat (1.3) in the front part of the casing (1) have a truncated cone shape, with the greater base facing the front part of the valve, as it has been demonstrated that this configuration provides the tightest seal, although it could have a spherical or other configuration.

Similarly, as shown in the figures, the option in which the punching means (1.2) in the front part of the casing have a circular punching line is most advantageous, such that these punching means (1.2) have a cylindrical or more precisely a truncated cone shape, as they have a suitable inclination for decasting the plastic.

An option for the attachment means (1.1) on the rear part of the casing is a thread that screws onto the part of the mould (6.1) to which the valve is attached, so that with the mould open and from inside it, it is possible to remove or insert the valve.

One way to ensure the seal of the valve throughout the time consists in preventing the rotation of the valve body (2), so that the valve body head (2.1) and its corresponding seat (1.3) always contact each other in the same way. This is achieved by making the stop (4) have a polygonal peripheral line corresponding to a recess made in the rear part of the casing (1), so that one is housed inside the other.

As shown in the figures, a specific embodiment of the peripheral polygonal line of the stop (4) and the corresponding recess can be a hexagon.

The means (5) for attaching the valve body to the stop in a simple manner can be a screw with a fillet that inserts in a thread of the stem of the valve body (2.2), as shown in the figures.

The plastic (7) used to make the hollow footwear soles is sometimes rubber, which has an optimum performance regarding the functions provided by the valve: it is correctly punched and allows introducing the gas (9) to form hollow soles.

The disclosed valve forms part of a method for using the same that comprises the following stages:

attaching the valve to the mould (6) using the attachment means (1.1) of the casing, closing the mould (6) with a first plastic (7) in the cavity of the mould (6), such that the punching means (1.2) rest against the opposite side of the mould (6) to that on which they are attached, acting as a die for the punching, and executing the punching of the plastic (7), opening the mould to introduce a second plastic (8) that acts as a cover against the first plastic (7), introducing the gas (9) through the valve to move forward the valve body (2) against the resistance of the helical spring (3) in order to separate the valve body head (2.1) from its seat (1.3), such that the gas (9) will reach the mould cavity to the assembly formed by the first and the second plastic (7,8).

Here, the first and the second plastic (7,8) refer to different portions of a part and to different types of plastic material, possibly even combining the two, as is common in footwear soles in which the part in contact with the cut is a softer material than the part in contact with the ground, which is harder and of a different colour.

The above-described method is advantageous when the first and the second plastic (7,8) are a rubber and the punching is performed during a first vulcanisation corresponding to the first plastic (7) of the rubber and the introduction of the gas (9) is performed during a second vulcanisation of the rubber corresponding to the second plastic (8), thereby forming the desired hollow sole.

The invention claimed is:

1. Valve for introducing a gas and punching plastic in moulds used to make hollow footwear soles, characterised in that it is linearly actuated and comprises a casing (1) attached to the mould (6.1) inside which it houses a valve body (2), a helical spring (3), a stop (4) and means (5) for attaching the valve body to the stop, the casing (1) is cylindrical and has attachment means (1.1) on its rear part and punching means (1.2) on its front part, the valve body (2) runs inside the casing (1) and comprises a head (2.1) and a stem (2.2), the means (5)

for attaching the valve body to the stop consist in a screw whose fillet is introduced in a first thread of the valve body stem (2.2), said valve body (2) being attached to the stop (4) by the means (5) for attaching the valve body to the stop, so that the helical spring (3) is crossed by the valve body stem (2.2) and limited on its front end by the casing (1) and on its rear end by the stop (4), the gas running between the valve body (2) and the casing (1), the valve body head (2.1) effecting a seal in a seat (1.3) in the front part of the casing (1), the punching means (1.2) surround the seat (1.3) and are farther forward than the front end of the valve body head (2.1) such that when the front part of the casing meets the plastic (7) it does so first with the punching means (1.2) in order to punch the plastic (7).

2. Valve according to claim 1 wherein the valve body head (2.1) and the corresponding seat (1.3) in the anterior part of the casing (1) have a truncated cone shape with the greater base facing the front part of the valve.

3. Valve according to claim 1 wherein the punching means (1.2) in the front part of the casing have a circular punching line.

4. Valve according to claim 1 wherein the circle has a diameter of 5 to 50 mm.

5. Valve according to claim 1 wherein the attachment means (1.1) on the rear part of the casing consist in a second thread that is screwed onto the part of the mould (6.1) where the valve is attached.

6. Valve according to claim 1 wherein the stop (4) has a polygonal peripheral line that corresponds to a recess in the rear part of the casing (1) to prevent the rotation of the valve body (2).

7. Valve according to claim 1 wherein the plastic (7) from which the hollow soles are made is rubber.

8. Method for using a valve for introducing gas and punching plastic in moulds for making hollow footwear soles according to the previous claims, characterised in that it comprises the following stages:

attaching the valve to the mould (6) by the attachment means (1.1) of the casing, closing the mould (6) with a first plastic (7) in a cavity of the mould (6) such that the punching means (1.2) rest on the opposite side of the mould (6.2) to that in which they are attached, so that they act as a punching die, and performing the punching of the plastic (7), opening the mould to introduce a second plastic (8) that acts as a cover against the first plastic (7), introducing a gas (9) inside the valve to move forward the valve body (2) against the force exerted by the helical spring (3) in order to separate the valve body head (2.1) from its seat (1.3) so that said gas (9) reaches the cavity of the mould formed by the first and the second plastic (7, 8), the cavity is created whereby the first and the second plastic (7, 8) are a rubber and the punching is performed during a first vulcanisation corresponding to the first plastic (7) of the rubber and the introduction of the gas (9) is performed during a second vulcanisation of the rubber corresponding to the second plastic (8).

* * * * *